(12) United States Patent
Merrick et al.

(10) Patent No.: US 6,412,863 B1
(45) Date of Patent: Jul. 2, 2002

(54) VEHICLE RESTRAINT SYSTEM WITH SLIDABLE SEAT

(75) Inventors: David D. Merrick, Cicero; James R. Chinni, Noblesville, both of IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 09/970,591

(22) Filed: Oct. 4, 2001

Related U.S. Application Data

(63) Continuation-in-part of application No. 09/528,744, filed on Mar. 20, 2000, now Pat. No. 6,328,379.

(51) Int. Cl.⁷ ................................................. B60N 2/42
(52) U.S. Cl. .............................................. 297/216.18
(58) Field of Search ........................ 297/216.1, 216.16, 297/216.18, 216.19, 216.2, 248, 483, 337

(56) References Cited

U.S. PATENT DOCUMENTS

| | | | | |
|---|---|---|---|---|
| 3,145,051 A | * | 8/1964 | Rausch | |
| 3,552,795 A | | 10/1968 | Perkins | |
| 3,761,127 A | * | 9/1973 | Giese et al. | |
| 4,738,485 A | * | 4/1988 | Rumpf | |
| 5,437,494 A | * | 8/1995 | Beauvais | |
| 5,567,006 A | * | 10/1996 | McCarthy | |
| 5,735,574 A | * | 4/1998 | Serber | |
| 6,027,167 A | * | 2/2000 | Blomdell et al. | |

* cited by examiner

Primary Examiner—Milton Nelson, Jr.
(74) Attorney, Agent, or Firm—Woodard, Emhardt, Naughton, Moriarty and McNett

(57) ABSTRACT

A vehicle seat has a back portion deformable forwardly when impacted from the rear by a passenger. A horizontally movable seat platform is slidably mounted to the seat frame and has restraint belts. The seat platform is normally held in an aft position until forward passenger force is applied through the lap belts to the movable platform during a crash.

17 Claims, 7 Drawing Sheets

VEHICLE RESTRAINT SYSTEM WITH SLIDABLE SEAT

CROSS REFERENCE TO APPLICATION

This application is a continuation-in-part of U.S. patent application Ser. No. 09/528,744, filed Mar. 20, 2000, now U.S. Pat. No. 6,328,379.

BACKGROUND OF THE INVENTION

The present invention relates generally to the field of vehicle restraint systems including belts for securing an occupant to a seat.

DESCRIPTION OF THE PRIOR ART

School bus passenger seats usually do not employ active restraint safety devices, but instead rely on a passive restraint seat design. School bus passenger seats are built to specifications conforming to the safety standards set by the National Highway Traffic Safety Administration, DOT. These are codified as 49 C.F.R. Ch.V, §571.222, Standard No. 222, and require that the seat back bend or deflect forward when a force is applied to the rear of the seat back. The code further specifies that 4000 W inch-pounds of energy must be absorbed within a maximum forward deflection of the seat back of 14 inches and 2800 W inch-pounds be absorbed within a maximum rearward deflection of the seat back of 10 inches where W represents the number of seating positions for which the seat is designed. 49 C.F.R., Ch.V, §571.222, S5.1.3–5.1.4. The code specifies a passive restraint system, and does not require any sort of active restraints, such as a two-point passenger restraining lap belt or a three-point passenger restraining lap belt and torso harness combination. Children riding the school bus are protected in head-on collisions by the seat back in front of them deflecting forward and absorbing some of their forward momentum.

Vehicles with deforming or deflecting seats provide special problems regarding the integration of active restraint seat belt systems. Passive restraint systems are designed to protect a passenger who has been thrown forward by having the impacted seat back deflect upon impact of the thrown passenger and absorb some of their momentum. In a school bus seat combining active and passive restraint systems, both of the restraint systems have to be able to perform their functions and the seat must still conform to the regulations set forth in 49 C.F.R.

In order to combine a deforming or deflecting seat with a seatbelt, we have mounted the belt to a portion of the seat which slides forward upon crash and away from the forwardly deforming seat back. Thus, the seat conforms with the aforementioned deflecting requirements but in addition includes a belt for securing the occupant to the seat. In one embodiment, a plurality of seats with seat belts are slidably mounted to the same seat frame and independently of each other slide forward upon crash. The U.S. Pat. No. 3,552,795 issued to Perkins et al discloses a seat having a seat portion and back portion slidable forward upon crash. The Perkins seat is not designed to provide an upright forwardly deforming seat back in addition to a seat slidable forward upon crash.

In the event a three-point seatbelt is to be utilized, it is necessary to provide a shoulder belt guide that will move with the seat as the seat slides forward upon crash. Disclosed is a combination seat and seat back with a belt guide slideable as a unit from the main seat frame in turn having a deflectable seat back frame.

SUMMARY OF THE INVENTION

One embodiment of the present invention is a seat for a vehicle comprising a main frame mountable in a vehicle and having a seat supporting frame and an upright back-supporting frame. A plurality of adjacent vehicle seats are slidably mounted on the seat-supporting frame and each have a normal aft position and a crash forward position. The seats are movable from the normal aft position to the crash forward position independent of movement of the upright back-supporting frame. A plurality of seat belts are mounted to the vehicle seats and are slidably therewith.

It is an object of the present invention to provide a plurality of seats slidably mounted on the same seat frame with the seats movable forward upon crash independent of each other.

It is a further object of the present invention to provide a seat with a seat frame and a back frame connected together as a unit and slidably mounted to a base frame having an upright frame with the seat movable in the forward direction upon crash independent of movement of the upright frame.

Related objects and advantages of the present invention will be apparent from the following description.

DESCRIPTION OF THE PREFERRED EMBODIMENTS

Figure 1:
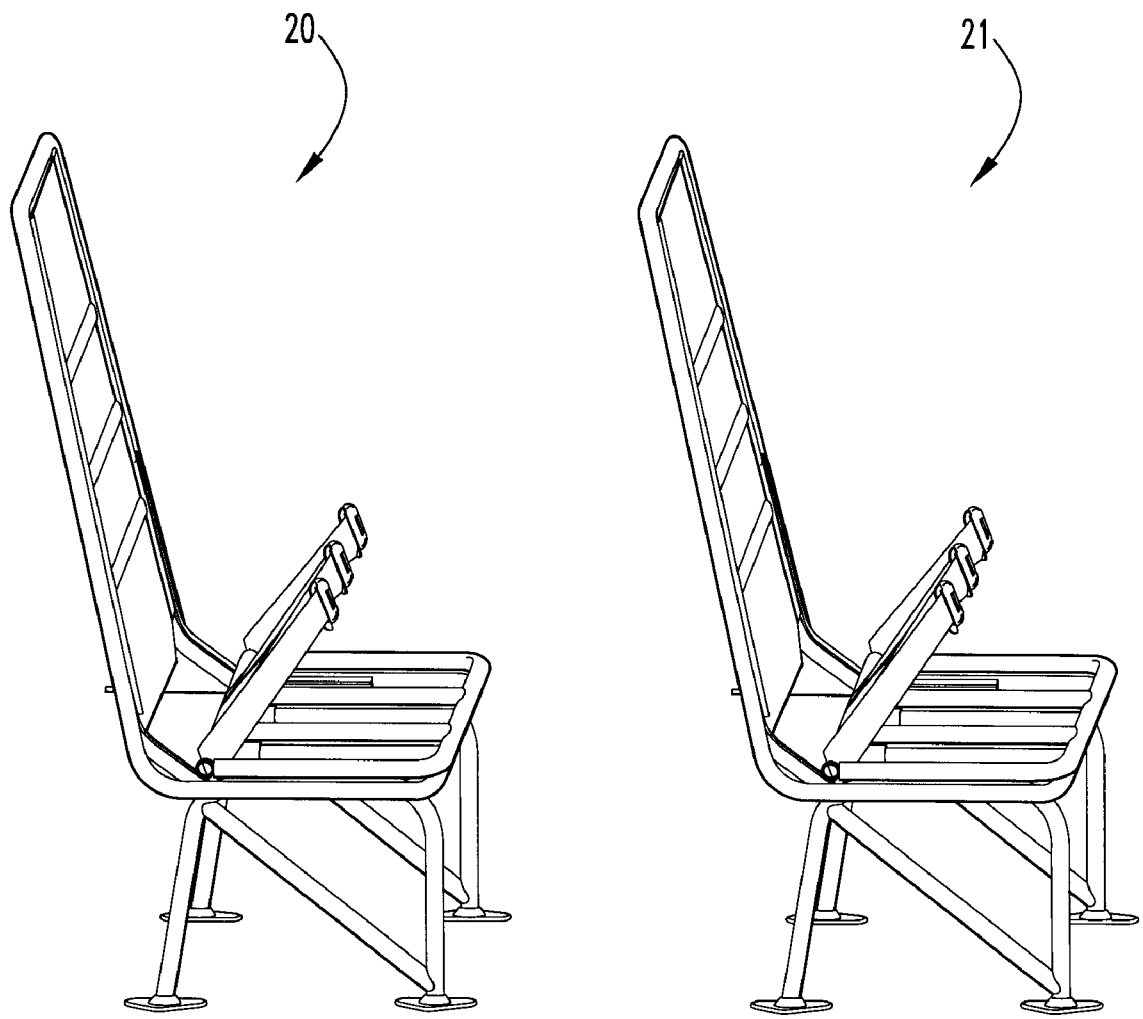
FIG. 1 is a side perspective view of a pair of seats arranged in a row incorporating a second alternate embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown the second alternate embodiment of a pair of identical bench style seats 20 and 21 typically used in a school bus. Each seat is sized to receive multiple occupants with a separate lap belt provided for each occupant. The seats have a tubular construction with the back of the seat being forwardly deformable or deflectable upon rear impact by a passenger located behind the seat back. The seat portion of the vehicle seat extends generally horizontally and is constructed to slide forward with the lap belts securing the occupants thereto during crash as the seat back deforms forwardly.

Seat 21 will now be described it being understood that an identical description applies to seat 20. The exact construction of seat 21 may vary; however, in the embodiment shown in FIGS. 2 and 3, the seat includes a main frame 22 forming a back portion 23 and a seat portion 24. The main frame has a tube 25 including opposite and downwardly extending tubular portions 27 and 28 extending from the top 26 of the chair to the bottom 29 of the back 23. Tube 25 has a pair of forwardly extending tubular portions 30 and 31 located on the opposite sides of the seat portion of the chair with the opposite ends of portions 30 and 31 joined at location 32 at the center and front end of the seat.

A pair of left legs 33 and 34 and a pair of right legs 35 and 36 extend downwardly from the frame and are secured to the vehicle floor. The top ends of legs 33 and 34 are joined to a horizontally extending tubular portion 37 (FIG. 3), in turn, secured to tubular portion 30 of tube 25. Likewise, the top ends of legs 35 and 36 are joined to the opposite end portions of a horizontally extending tubular portion secured to tubular portion 31.

A diagonal brace 38 has a bottom end fixed to the bottom portion of leg 34 and a top end 39 secured to downwardly extending portion 27 of tube 25. A similar diagonal brace 40 has a bottom end fixed to the bottom portion of leg 36 and the top end secured to portion 28 of tube 25.

A web 41 is secured to the top 26 and portions 27 and 28 of tube 25 forming the seat back portion of the seat. The entire seat back portion is enclosed within suitable upholstery.

The seat portion of the vehicle seat includes, in addition to portions 30 and 31 of tube 25, a cross member 41 (FIG. 3) having opposite ends joined to diagonal braces 38 and 40 or portions 30 and 31 of tube 25. A pair of stationary members 42 and 43 have first ends fixed to cross member 41 and opposite ends fixed to the opposite end portions 44 and 45 of tube 25.

Movable frame 46 is slidably mounted to stationary members 42 and 43. Frame 46 includes side tubular portions 48 and 49 having front-end portions joined to cross member 50 and aft end portions joined to cross member 51. Two interior tubular members 52 and 53 extend between and are joined to cross members 50 and 51. Fixedly mounted to and depending from tubular portions 52 and 53 are respectively sleeves 54 and 55 through which respectively stationary members 43 and 42 extend. Sleeves 54 and 55 are freely slidable upon members 43 and 42 allowing movable frame 46 to slide from the rearward or aft position depicted in FIG. 2 to the most forward crash position depicted in FIG. 3.

Figure 2:
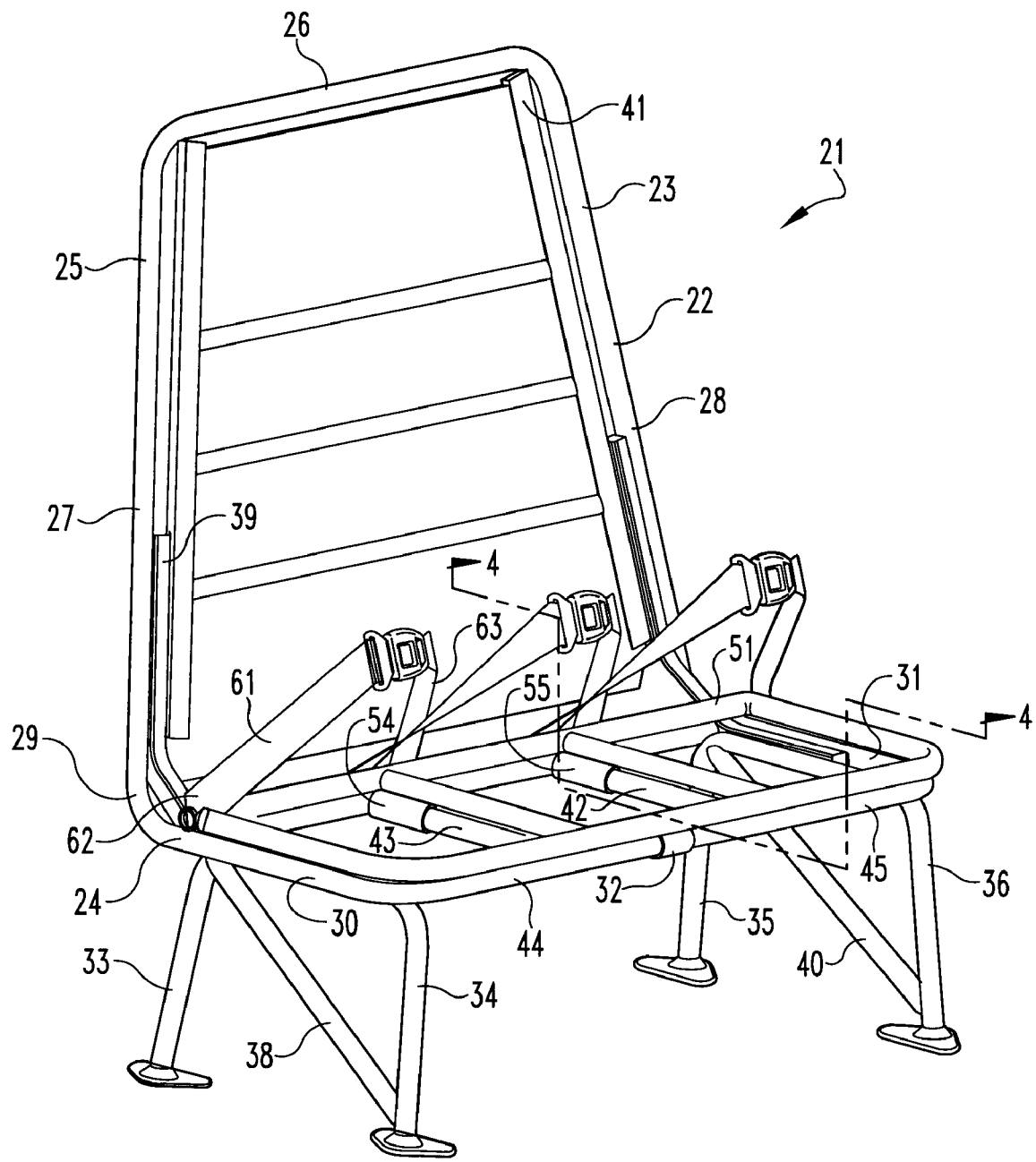
FIG. 2 is a front perspective view of one of the seats of FIG. 1.

In the embodiment of the seat depicted in FIG. 2, the seat is sufficiently wide to hold three occupants. Thus, three lap belts have their proximal ends attached to cross member 51 with the distal ends having mating tongue and buckle combinations. For example, belts 61 and 63 have their proximal ends 62 secured to member 51 with the outer or distal ends having respectively a buckle and mating tongue. Thus, the lap belts move with the occupant as the movable frame 46 slides from the aft position of FIG. 2 to the forward position of FIG. 3.

Figure 4:
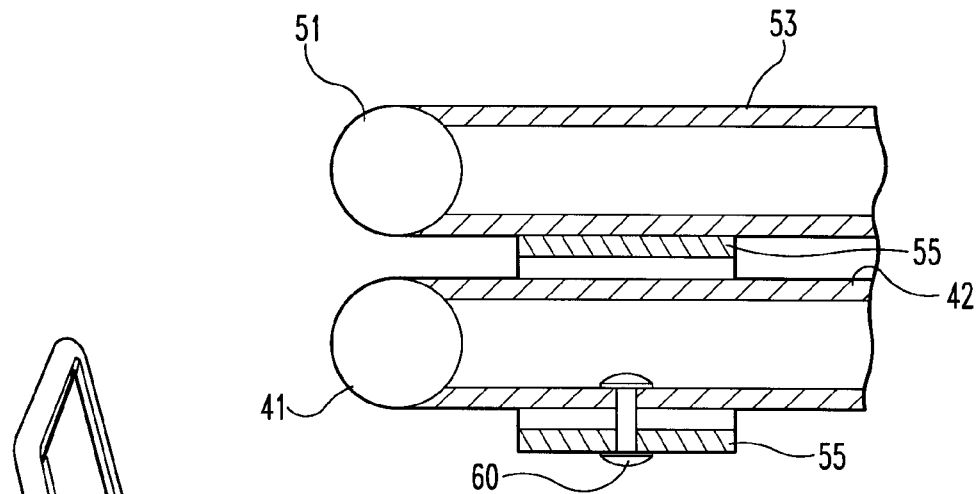
FIG. 4 is an enlarged, fragmentary cross sectional view taken along the line 4—4 of FIG. 2 and viewed in the direction of the arrows.
Figure 3:
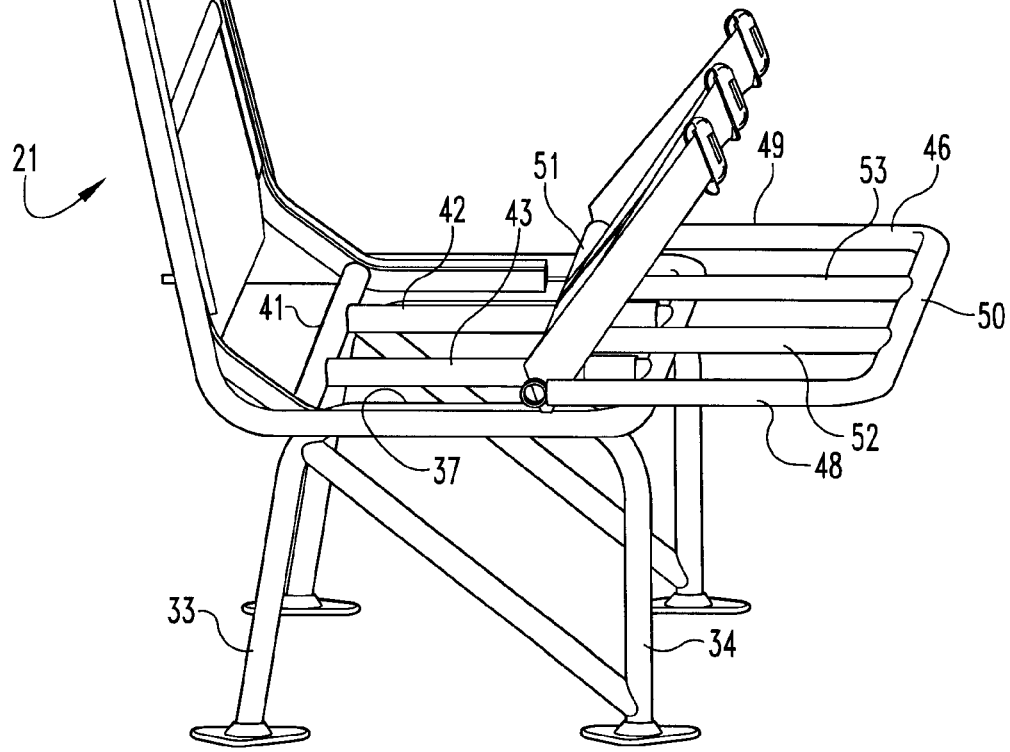
FIG. 3 is a side perspective view of one of the seats of FIG. 1 only with a portion of the seat and belt moved to the most forward crash position.

Sleeves 54 and 55 are slidably mounted to tubes 43 and 42 but include fastening means for securing the sleeves and movable platform in the most aft position as depicted in FIG. 2. The fastening means may include conventional fasteners, such as, rivets or shear pins. In the embodiment depicted in FIG. 4, rivet 60 has a shank extending through the adjacent side walls of sleeve 55 and tube 42 with the opposite headed ends of the rivet being positioned within tube 42 and external to sleeve 55. Sleeve 55 and platform 46 are normally held in the aft position by rivet 60. Upon crash, forward force may be applied by the occupant to the lap belts urging movable frame 46 forwardly while the main frame of the seat remains fixed to the vehicle floor. Upon application of sufficient force, rivet 60 shears allowing the movable frame 46 with occupant to move to the most forward position as depicted in FIG. 3. Simultaneously, a passenger sitting on seat 20 behind seat 21 may impact on back frame 23 bending the frame forwardly to be in accordance with the aforementioned regulations. A similar rivet secures sleeve 54 to tube 43 and is shearable in the same fashion as rivet 60.

A suitable upholstery material is provided on movable frame 46 and seat frame 22. Further, a planar member, such as a wooden sheet may be attached to movable frame 46 and positioned immediately therebeneath to provide a smooth surface to slide atop portions 44 and 45 of tube 25.

Many advantages of the present invention are provided over the prior art. For example, the seats designed in accordance with the aforementioned federal regulations provide a protective envelope in the event of a crash with the occupant striking the cushion back surface of the seat in front of the occupant. By the addition of the seat belts and the movable seat frame, the occupants on the movable frame are further restrained.

Figure 5:
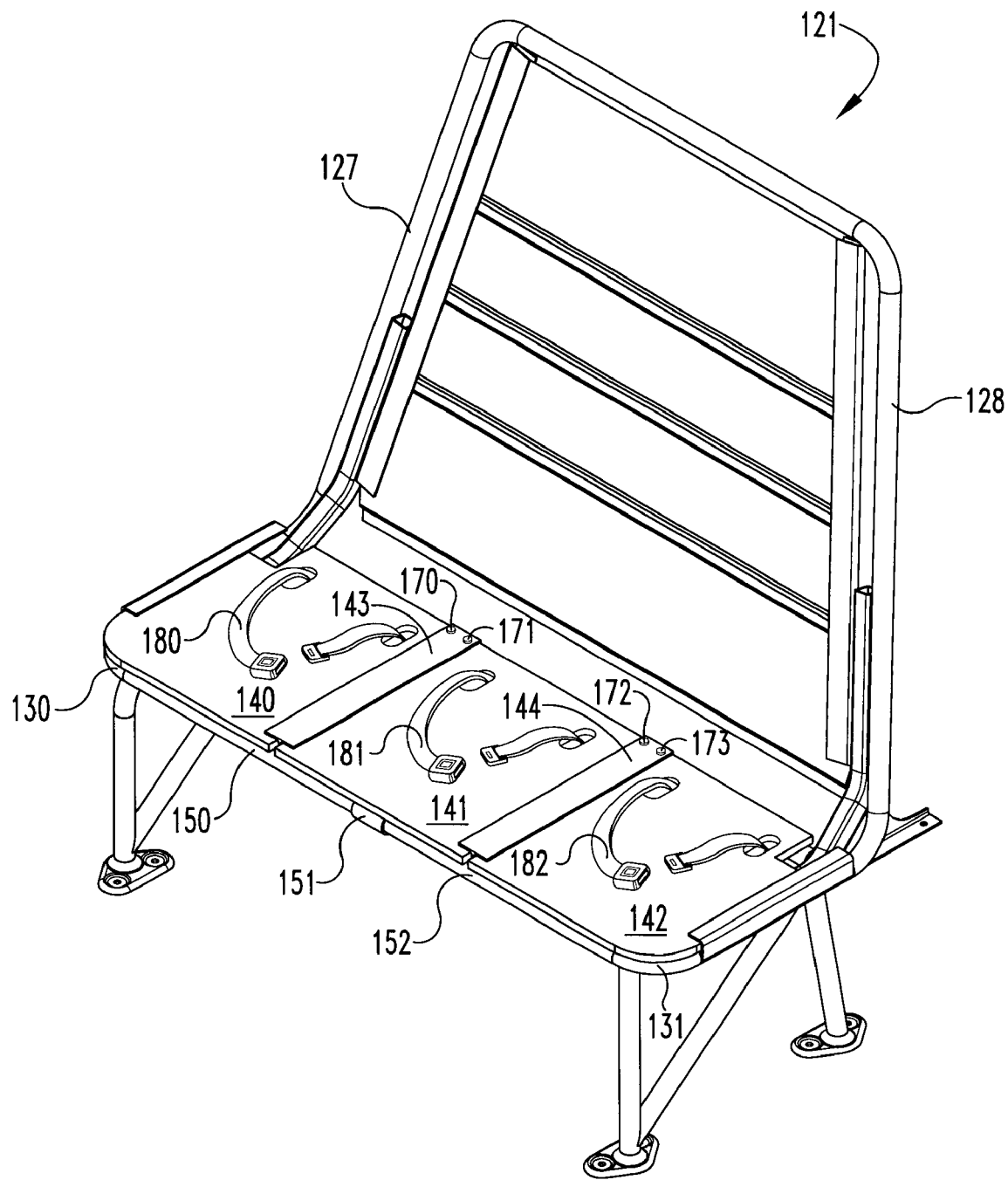
FIG. 5 is a front perspective view of the preferred embodiment of the seat incorporating the present invention with the seat portions being shown in the aft or normal position.
Figure 6:
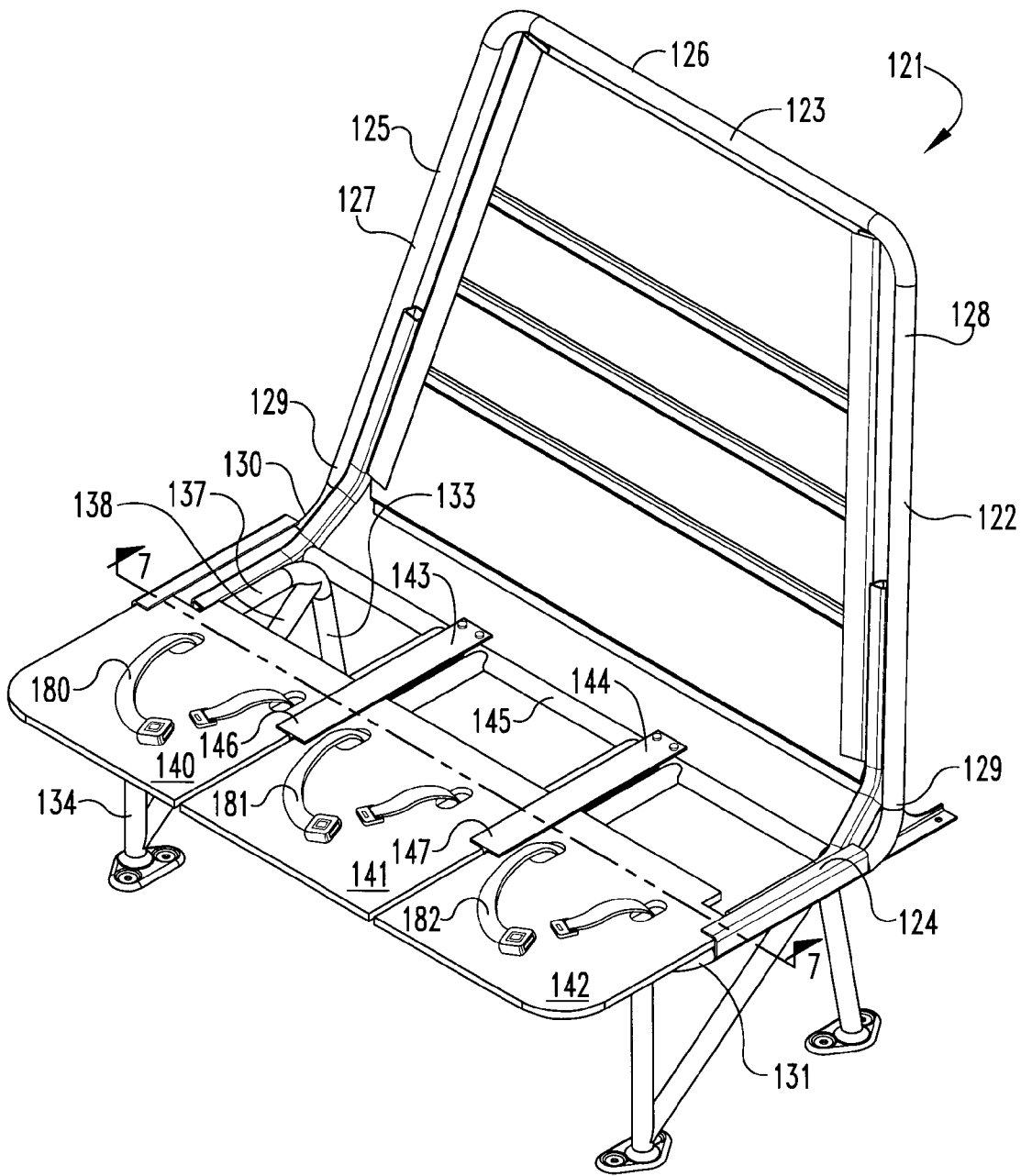
FIG. 6 is the same view as FIG. 5 only showing the seat portions in the forward crash position.

The preferred embodiment of the seat incorporating the present invention is shown in FIGS. 5 and 6. Seat 121 is similar to seat 21 with the exception that seat 121 is provided with three separate seat portions slidable upon crash to a forward position independent of each other and with the exception of the manner of slidably mounting the seat portions to the seat frame.

Seat 121 has a main frame 122 (FIG. 6) forming a back portion 123 and a seat portion 124. Tube 125 has downwardly extending tubular portions 127 and 128 extending from the top 126 of the seat to the bottom 129 of the back 123. Tube 125 has a pair of forwardly extending tubular portions 130 and 131 located on the opposite sides of the seat portion of the chair with the opposite ends of portions 130, 131 joined at the mid point of the seat and at the front end of the seat in a manner as previously described for seat 21.

A pair of left legs and a pair of right legs extend downwardly from the frame and are secured to the vehicle floor. For example, legs 133 and 134 are joined to a horizontally extending portion 137, in turn, secured to tubular portion 130 of tube 125. Likewise, the top ends of the right pair of legs are joined to the opposite end portions of a horizontally extending tubular portion 131. A diagonal brace 138 of the bottom end fixed to the bottom portion of leg 134 and a top end secured to the top of leg 133. Similarly, a diagonal brace is provided for the right pair of legs.

In the embodiment shown in FIG. 5, seat 121 is provided with three slidably mounted seat portions 140, 141 and 142; however, it is to be understood the present invention includes a seat 121 having as few as two such seat portions or a number greater than two such seat portions.

A pair of T-shaped brackets 143 and 144 have aft ends fixedly mounted to tubular cross member 145, in turn, having opposite ends fixedly connected to the bottom end portions 129 of seat back 123. The forward ends 146 and 147 of brackets 143 and 144 are fixedly connected to tubular portions 150 (FIG. 5) and 152, in turn, fixedly connected together at adjacent ends 151 with the opposite ends being fixedly connected to tubular portions 130 and 131.

Figure 7:
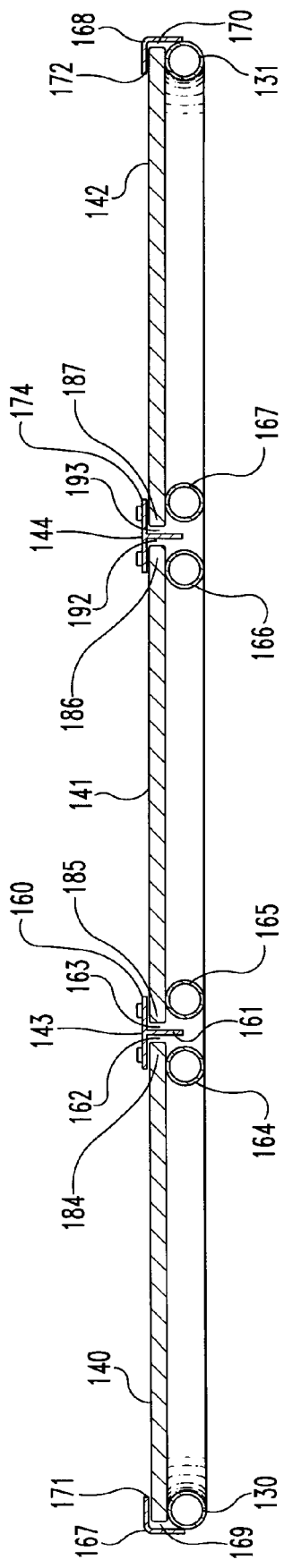
FIG. 7 is an enlarged, fragmentary cross-sectional view taken along the line 7—7 of FIG. 6 and viewed in the direction of the arrows.

Brackets 143 and 144 form oppositely opening recesses for the seat portions to slide from the aft position to the forward crash position. Bracket 143 (FIG. 7) has a top wall 160 connected to an over hanging vertical wall 161 forming recess 162 and 163 into which respectively the longitudinally extending edge portions 184 and 185 of seat portions 140 and 141 extend. Similarly, the longitudinally extending edge portions 186 and 187 of seat portions 141 and 142 extend into the oppositely opening recesses 192 and 193 of bracket 144. A pair of right angle brackets 167 and 168 are mounted atop respectively tubular portions 130, 131 and form inwardly opening recesses 169 and 170 into which the longitudinally extending edge portions 171 and 172 of seat portions 140 and 142 extend and slide. A pair of tubes 164 and 165 have opposite ends fixedly joined to cross-member 145 and tubular portion 150 whereas a second pair of tubes 166 and 167 have opposite ends fixedly connected to cross-member 145 and tubular portion 152. Tubes 164 and 165 are located immediately beneath the longitudinal extending edge portions 184 and 185 whereas tubes 166 and 167 are located immediately beneath the longitudinally extending edges 186 and 187. Thus, seat portion 140 slidably rests atop tubes 130 and 164, seat portion 141 slidably rests atop tubes 165 and 166, and seat portion 142 slidably rests atop tubes 167 and 131.

A pair of shear pins 170 and 171 (FIG. 5) extends downwardly through wall 160 (FIG. 7) and into respectively the longitudinally extending edge portions 184 and 185 of seat portions 140 and 141. Likewise, a pair of shear pins 172 and 173 (FIG. 5) extend downwardly through the top wall 174 (FIG. 7) of bracket 144 and into the longitudinally extending edge portions 186 and 187 of seat portions 141 and 142. Shear pins 170–173 are operable to normally retain the seat portions in the aft position. The shear pins will shear allowing the seat portions to move to the forward crash position once sufficient forward force is applied to the seats by the passengers resting atop the seats with the force being applied from the passengers through the respective seat belts attached to the seat portions. Three separate lap belts 180, 181 and 182 are secured respectively to seat portions 140, 141 and 142. Each lap belt consists of a pair of belts joined together by a conventional buckle tongue combination with the opposite ends of the pair of belts being attached directly to the seat portion. For example, the two belts forming lap belt 180 extend through seat portion 140 and are fixedly mounted to the downwardly facing surface of seat portion 140.

Figure 8:
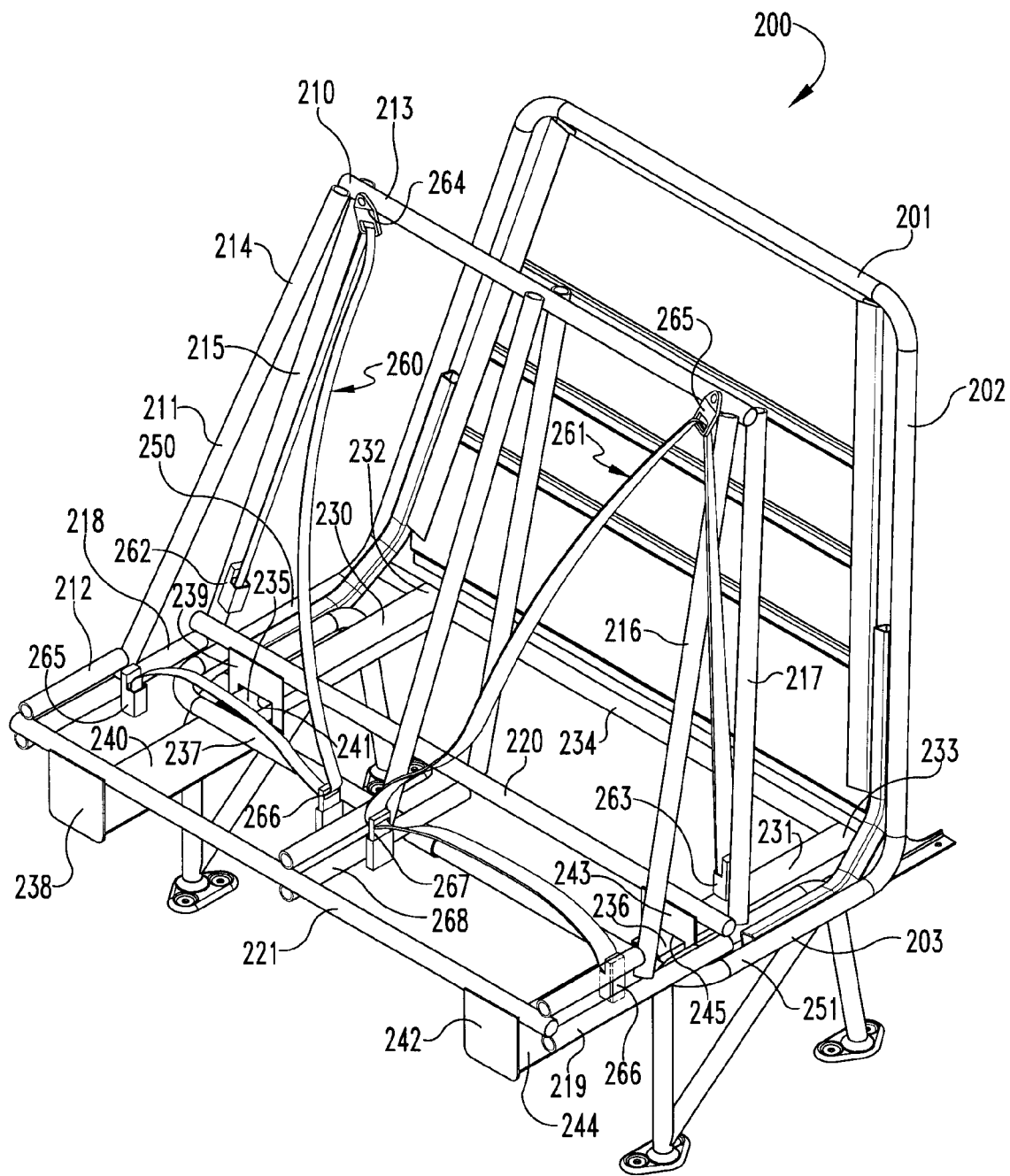
FIG. 8 is a front perspective view of the first alternate embodiment of the seat incorporating the present invention with the seat portion shown in the forward crash position.

The first alternate embodiment of the seat incorporating the present invention is shown in FIG. 8. In order to more clearly illustrate the construction of the seat frames, the cushions and upholstery have been omitted from seat 200 (FIG. 8) as well as seat 21 (FIG. 2) and seat 121 (FIG. 5). Seat 200 has a frame 201 similar to the seat frame described for seat 121. That is, seat frame 201 includes a back frame portion 202 and seat frame portion 203 formed by tubular members joined together. The tubular members extend downwardly on the opposite sides of back frame portion 202 being joined together at the top of the seat. The tubular members then extend forwardly on the opposite side of seat frame portion 203 being joined together in the middle and the forward portion of the seat frame as previously illustrated and described. A pair of left legs and a pair of right legs are joined to and depend from the seat frame portion 203 supporting the seat above the vehicle floor.

A movable seat frame 210 is slidably mounted atop frame 201 and includes a seat back 211 joined to a seat 212. Movable frame 210 includes a horizontally extending upper tubular member 213 joined on the left side of the seat to a pair of depending tubular members 214 and 215 and on the right side of the seat to a pair of depending tubular members 216 and 217. The bottom ends of tubular members 214 and 215 are fixedly connected to a horizontal and forwardly extending tubular member 218 whereas the bottom ends of tubular members 216 and 217 are fixedly mounted at their bottom ends to a horizontal and forwardly extending tubular member 219. Members 218 and 219 extend between and are joined to a rear cross-member 220 and a forward cross member 221. Tubular members 218 and 219 are positioned above side tubes 250 and 251 of seat portion 203 and slidably rest thereatop thereby providing support for the movable frame 210.

Movable frame 210 is slidably mounted on a pair of inverted c-shaped rails 230 and 231 fixedly mounted to seat frame 201. The aft ends 232 and 233 of rails 230 and 231 are fixedly connected to frame 201. For example, aft ends 232 and 233 may be fixedly connected to cross-member 234 having its opposite ends attached to the side tubular members of frame 201. Likewise, the forward ends 235 and 236 of rails 230 and 231 are fixedly connected to frame 201 and may be attached, for example, to the front tubular portion 237 of frame 201.

A pair of depending walls 238 and 239 are fixedly connected respectively to tube 221 and 220 with horizontal wall 240 extending between and connected to walls 238 and 239. Wall 239 includes an inverted c-shaped opening 241 through which rail 230 extends. Likewise, a pair of walls 242 and 243 depend from and are connected to tubes 221 and 220 and are connected together by wall 244 extending therebetween. Wall 243 is provided with an inverted c-shaped opening 245 through which rail 231 extends. Thus, frame 210 is slidably mounted to rails 230 and 231 and is movable from the normal aft position whereat movable frame 210 is adjacent back frame portion 202 to a forward crash position crash position (FIG. 8) wherein frame 210 is spaced apart from back frame portion 202.

A pair of three-point restraint belts 260 and 261 are mounted to movable frame 210. The three-point restraint belts may be conventional in nature having a pair of retractors 262 and 263 mounted, for example, to tubes 215 and 217 with the belts extending from the retractors upwardly through a pair of D-loop guides 264 and 265 mounted to tube 213 with the belts then extending downwardly across the shoulder of each passenger and then across the lap of each passenger having distal ends 265 and 266 attached to frame 210, for example, to tubes 218 and 219. A pair of conventional seat belt buckles 266 and 267 are mounted to the center tube 268 of the movable frame by suitable means, such as by straps. Conventional tongues are slidably mounted to the seat belts for engaging buckles 266 and 267 forming the lap belt portions.

Many variations are contemplated and included in the present invention. For example, frame 22 (FIG. 2), frame 122 (FIG. 6) and frame 202 (FIG. 8) may include a conventional mechanism for allowing the seat back to recline. In the case of seat 200, the present invention includes providing a reclining mechanism to allow the seat back portion of movable frame 210 to also recline.

The seat shown in FIG. 8, is designed to accommodate two passengers; however, a greater number of passengers may be accommodated by the seat with a separate three-point restraint system being provided for each passenger.

The seat back portion 122 is normally upright and stationary as previously described for the seat back portion 22 of seat 21. Seat back portion 122 remains stationary as seat portions 140, 141 and 142 slide forward during vehicle crash unless the seat back is impacted from behind by a passenger and pushed forwardly with the seat back restraining the passenger located there behind. In such a case, the passengers resting upon seat portions 140–142 are moved away from the forwardly bending seat back portion 122. Likewise, seat 200 has a seat back portion 202 which remains stationary as the movable frame 210 slides forward during vehicle crash unless the seat back portion 202 is impacted from behind by a passenger and pushed forwardly with the seat back portion 202 restraining the passenger located there behind. Nevertheless, the seat back 211 of movable frame 210 remains upright and slides forward therewith; however, seat back 211 does not bend forward even though back portion 202 is impacted from behind by a passenger.

Rails 230 and 231 are oversized relative to openings 241 and 245 thereby providing a force fit between the rails and walls 239 and 243. Thus, movable frame 210 is normally held in the rearward or aft position thereby positioning frame 211 adjacent frame 202. Upon crash, forward force is applied by the passengers to the restraint belts 260 and 261 thereby applying forward force to movable frame 210 causing plates 239 and 243 to slide forwardly along the length of rails 230 and 231. Alternative means may be utilized to secure movable frame 210 in the aft position including shear pins, tearable plastic members or other suitable means.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A seat for a vehicle comprising:
a main frame mountable in a vehicle and having a seat supporting frame and an upright back supporting frame;
a plurality of adjacent vehicle seats slidably mounted on said seat supporting frame and each having a normal aft position and a crash forward position, said seats movable from said normal aft position to said crash forward position independent of movement of said upright back supporting frame; and,
a plurality of seat belts mounted to said vehicle seats to restrain a passenger on each of said vehicle seats and to transmit passenger crash loads to said vehicle seats.

2. The seat of claim 1 and further comprising:
a plurality of retainers securing said vehicle seats to said main frame in said normal aft position but allowing said vehicle seats to move independently of each other to said crash forward position when passenger crash loads are applied.

3. The seat of claim 2 wherein:
said seat supporting frame and said seats are telescopically connected together allowing said seats to slide from said normal aft position to said crash forward position.

4. The seat of claim 3 wherein:
said seat supporting frame includes a plurality of channels extending in a direction from said normal aft position toward said crash forward position with said channels slidably receiving said seats.

5. The seat of claim 4 wherein:
said back supporting frame has a normal upright position and a forward leaning crash position, said back supporting frame connected to said seat supporting frame and movable forward from said normal upright position to said forward leaning crash position when impacted from behind by a passenger and pushed forwardly.

6. The seat of claim 5 wherein:
said seats have edge portions extending in a direction from said normal aft position toward said crash forward position, said channels have recesses slidably mounting said edge portions thereto.

7. The seat of claim 2 wherein:
said retainers include fasteners extending from said main frame into said seats.

8. A seat for a vehicle comprising:
a main frame mountable in said vehicle, said main frame includes a generally horizontally extending base frame and an upright frame extending upwardly therefrom;
a seat with a seat frame and a back frame connected together as a unit being slidably mounted to said base frame and movable from a normal aft position to a crash forward position, said seat further including a belt guide provided on said back frame; and,
a seat belt mounted to said seat and forming a lap belt portion, said seat belt extending upwardly through said guide forming a torso belt portion and movable with said unit from said normal aft position to said crash forward position independent of movement of said upright frame.

9. The seat of claim 8 wherein:
said upright frame remaining stationary as said seat slides forwardly from said normal aft position to said crash forward position unless said upright frame is impacted from behind and pushed forwardly.

10. The seat of claim 9 and further comprising;
said base frame and said seat frame are telescopically connected together.

11. The seat of claim 10 and further comprising:
a retainer between said base frame and said seat frame limiting relative motion between said base frame and said seat frame until crash.

12. The seat of claim 11 wherein:
said retainer includes a movable member and a stationary member slidably connected together and mounted to said base frame and said seat frame.

13. The seat of claim 12 wherein:
said movable member and said stationary member include an aperture and an elongated member, said elongated member extends through said aperture with relative slidable motion between said aperture and said elongated member occurring as said seat moves from said normal aft position to said crash forward position.

14. A vehicle seat comprising:
a main frame having a generally horizontally extending seat supporting frame and an upright frame connected together;

a seat slidably mounted upon said seat supporting frame, said seat having a normal aft position and a crash forward position;

a seat back connected to said seat and movable with said seat as said seat moves from said normal aft position to said crash forward position independent of movement of said upright frame, said seat back has a first belt guide mounted thereto; and, a first seat belt connected to said seat and movable therewith as said seat moves from said normal aft position to said crash forward position, said seat belt extending over said seat forming a lap belt portion and upwardly to said guide forming a shoulder belt portion.

15. The vehicle seat of claim 14 wherein:

said upright frame is rigid and stationary as said seat back moves apart therefrom to said crash forward position unless said upright frame is impacted from behind in which case said upright frame moves forwardly.

16. The vehicle seat of claim 15 wherein:

said seat supporting frame includes a plurality of parallel channels; and, said seat has a plurality of downwardly extending brackets with said channels extending slidably therethrough guiding said seat and seat back from said normal aft position to said crash forward position.

17. The vehicle seat of claim 15 wherein:

said seat back includes a second belt guide mounted thereto, and further comprising:

a second seat belt connected to said seat and movable therewith as said seat moves from said normal aft position to said crash forward position, said second seat belt extending over said seat forming a lap belt portion and upwardly to said second belt guide forming a shoulder belt portion.

\* \* \* \* \*